Dec. 9, 1941.   E. ORSHANSKY, JR   2,265,307
WINDSHIELD WIPER MOTOR
Filed Oct. 5, 1940   2 Sheets-Sheet 1
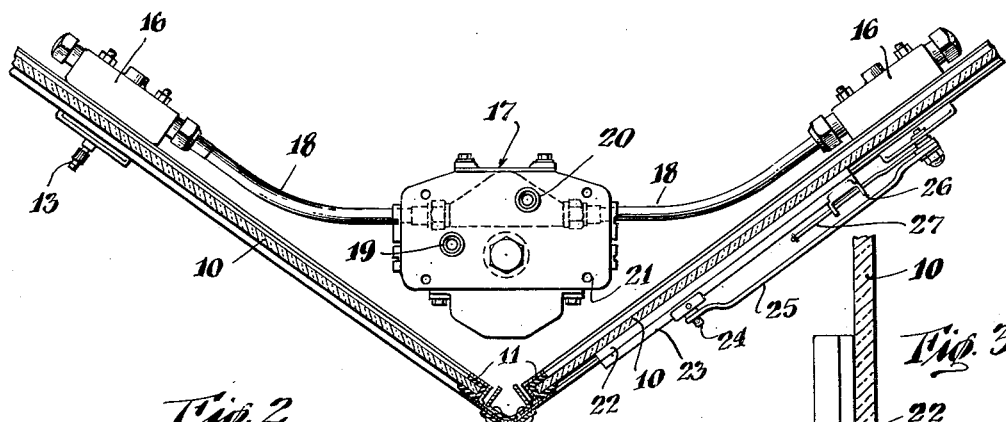
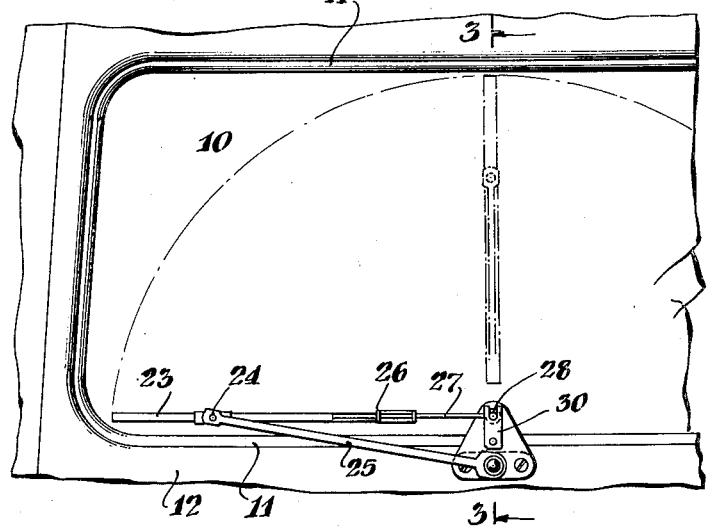
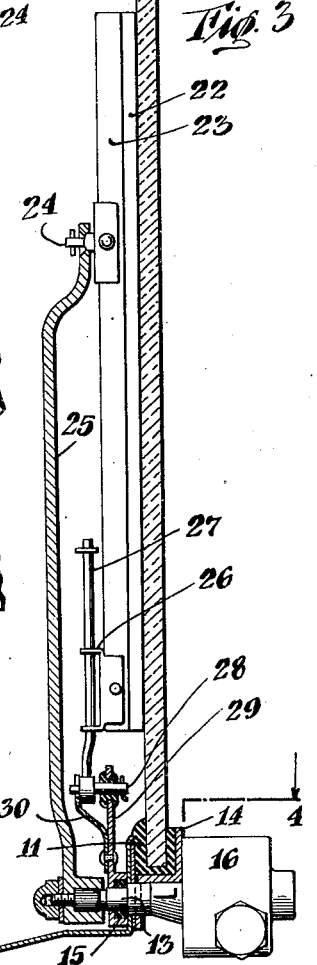
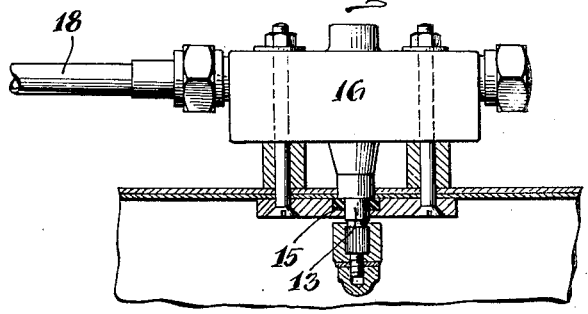
INVENTOR
*Elias Orshansky, Jr.*
BY
ATTORNEYS Dec. 9, 1941.  E. ORSHANSKY, JR  2,265,307
WINDSHIELD WIPER MOTOR
Filed Oct. 5, 1940  2 Sheets-Sheet 2
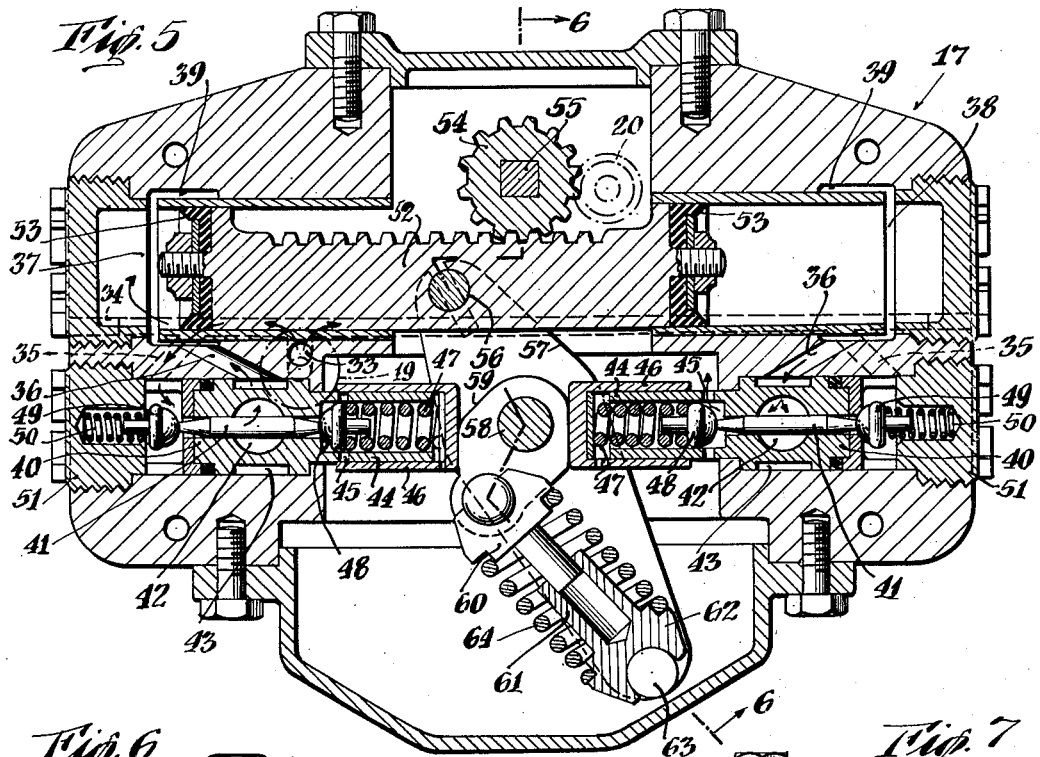
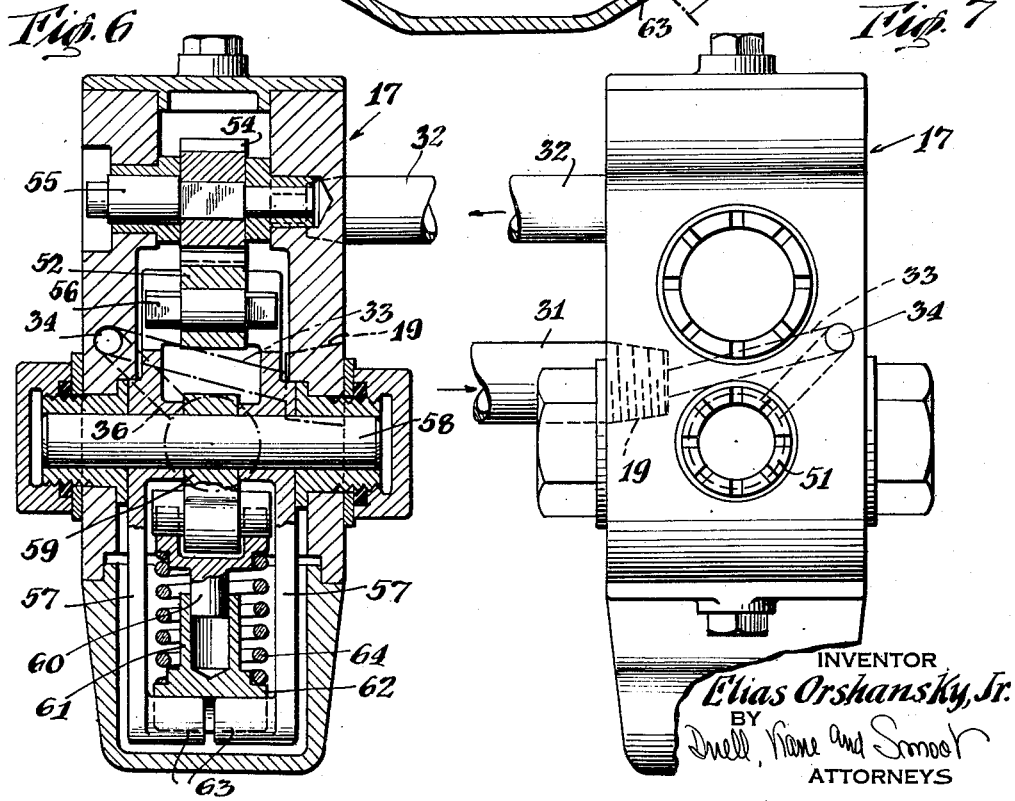
INVENTOR
*Elias Orshansky, Jr.*
BY
ATTORNEYS Patented Dec. 9, 1941

2,265,307

UNITED STATES PATENT OFFICE 2,265,307

WINDSHIELD WIPER MOTOR

Elias Orshansky, Jr., Cleveland, Ohio, assignor to The Aerotorque Company, Cleveland, Ohio, a corporation of Ohio Application October 5, 1940, Serial No. 359,865

11 Claims. (Cl. 121—164)

This invention relates to a structurally and functionally improved type of windshield wiper, and especially the motor and power transmitting mechanism for the same.

In certain respects, the present invention is to be considered as presenting a commercially and functionally improved structure over that included in my prior application for patent on windshield wiper motor which is identified in the United States Patent Office records under Serial Number 336,567 and has a filing date of May 22, 1940.

Primarily, it is an object of the invention to furnish an apparatus of this type and which will be of particular utility when employed in connection with aircraft and especially airplanes. As such, a heavy-duty unit is presented which is capable of being used in numerous different associations, and which when employed in aircraft will operate in an entirely satisfactory manner and despite the large loads which may be imposed incident to the accumulation of ice and sleet and the fact that the parts operated by the motor may be functioning in slipstreams of very high velocity.

Another object of the invention is that of furnishing a windshield wiper mechanism which will embody relatively few parts, each individually simple and rugged in construction, so that these parts may be manufactured and assembled at relatively low costs, and when so assembled will function with entire satisfaction throughout the life of the apparatus.

With these and other objects in mind, reference is had to the attached sheets of drawings ilustrating one practical embodiment of the invention and in which:

Fig. 1 is a plan view of a windshield wiper installation such as would occur in an airplane and showing the forward panels of the cockpit;

Fig. 2 is a face view of a fragment of one of such panels with the wiper and supporting structure shown in association therewith;

Fig. 3 is an enlarged sectional side view taken along lines 3—3 and in the direction of the arrows as indicated in Fig. 2;

Fig. 4 is a fragmentary plan view taken along the lines 4—4 and in the direction of the arrows as indicated in Fig. 3;

Fig. 5 is an enlarged sectional view taken through the motor unit;

Fig. 6 is a traverse sectional view taken along the lines 6—6 and in the direction of the arrows as indicated in Fig. 5; and, Fig. 7 is an end view of the motor unit.

As afore brought out, the present invention is of primary utility when employed in connection with aircraft. Accordingly, it has been shown in such an association. This is to be taken in an illustrative rather than in a limiting sense, except where the contrary is indicated in the appended claims.

Thus, referring especially to Figs. 1 to 4, the numeral 10 indicates a pair of transparent panels arranged at angles with respect to each other and providing a commonly accepted form of windshield suitable for aircraft. These panels may be of any desired configuration, area and material, and it is obvious that any desired number of the same might be employed according to the design of airplane which is involved.

The frames 11 may form a part of or be otherwise secured to the walls 12 of the airplane, and these frame portions or parts adjacent thereto may be pierced to provide for the passage of operating shafts 13 from the interior to the exterior of the airplane. Preferably, one shaft is used for each panel, but again it is obvious that this technique may vary in accordance with the results which are to be obtained. Each of the shafts conveniently extends through a suitable bearing enclosed within the housing portion 14 and beyond which a rubber bearing 15 may be disposed. The housing portion 14 is extended in the form of a casing 16 which houses a pinion secured to shaft 14 and a rack which is reciprocable within the casing. These details have not been shown in view of the fact that their construction is well-known to those skilled in the art.

If an arrangement such as has been illustrated in Figs. 1 to 4 is involved, the motor generally indicated at 17 may be mounted adjacent the point of juncture of the two panels 10 and within the cockpit. Extending from this motor are tubes or conduits 18 which house Arens controls or any other suitable elements which are connected to the aforementioned racks and are capable of transmitting reciprocatory movement to the latter.

The motor casing is also formed with ports 19 and 20, the former connecting to a source of fluid under high pressure, while the latter connects to a return line. The source may be in the form of any high-pressure line available on the airplane and including, for example, the high-pressure line which may extend from the auxiliary pump or compressor and which is usually employed for the operation of accessories such as landing gear, flaps, feathering and unfeathering controls, etc. It is also to be noted that the motor may be mounted in any desirable manner as, for example, by receiving bolts within threaded bores 21 forming a part of the casing 17 and which bolts extend through supports (not shown) conveniently provided in the cockpit.

It is preferred, according to the present invention, to employ rubber blades 22 which traverse the surface of the panel or panels for the purpose of clearing the same. These strips may be backed by metal as indicated at 23, and a pin 24 may extend from the backing strip and have pivotal connection with an operating arm 25. The operating arm has its inner end secured to the shaft 13 and should preferably embody a certain amount of resiliency or spring action such that it will constantly urge the strip 22 into proper contact with the surface of the panel 10. In order to supplement the resiliency of arm 25, the inner end of the rubber strip may carry a bracket 26 which slidably accommodates a rod 27 secured to a pin 28. The latter is supported in a bracket portion 29, and a spring strip 30 may likewise be attached to this portion and yieldingly cooperate with the end of shaft 28 in order to constantly transmit through rod 27 and bracket 26 pressure to the wiper blade such that its inner end is urged into contact with the surface of the panel. It will additionally be apparent that by this construction the range or field traversed by the wiper blade would be greater than would be the case were such blade merely secured to the arm 25.

Now referring to the mechanism enclosed within the motor and by means of which oscillation of shafts 14 is effected, attention is especially directed to Figs. 5 to 7. In these views it will be observed that lines 31 and 32 are respectively connected to the openings or ports 19 and 20. Extending from port 19 is a passage 33 which has its inner end connected to a bore or manifold 34. The latter connects adjacent its opposite ends with passages 35 which extend to what might be termed the valve chambers of the motor. In turn extending from the latter are passages 36 which communicate with the ends of cylinders 37 and 38. Such cylinder ends may conveniently be enlarged as indicated at 39 so as to provide a space communicating with each of the passages 36, and so that fluid may readily be distributed from the latter to the cylinders and also in opposite directions.

Within each of the valve chambers are disposed plug members 40 which include bodies formed with longitudinally extending bores slidably accommodating rods or pins 41. The configuration of these bores and pins is different so that fluid may flow between the same. For example, the bores may be annular while the pins may be polygonal in section; and the length of these pins is such that they serve as valve actuators in a manner hereafter brought out. Also, each of the plugs is formed with a transverse bore 42 communicating with its first-named bore, and this transverse bore in turn communicates with a groove 43 formed on the outer face of the plug and which provides access to the passages 36.

It will finally be noted that each of the plug elements provides valve seats at the opposite ends of its longitudinally extending bore and that each of these elements may also conveniently be formed with a tubular extension 44 which is provided with openings 45.

Mounted upon each of these extensions are followers 46 against which one end of a spring 47 acts. This spring is housed within the socket provided by the extension and these sockets in each instance also house and slidably support a valve 48 which cooperates with the seat formed at one end of the longitudinal bore of the plug.

A valve 49 is also provided adjacent the opposite ends of the last-named bores of the plugs and cooperates with the seat furnished at this point. Such cooperation is assured by a spring 50 which is preferably of less value than the spring 47. One end of the spring engages the valve 49 while the opposite end of the same may bear against cap 51 closing one end of the valve bore or chamber. At the same time it will also be observed that the rods 41 have a length such that they simultaneously contact both valves 48 and 49 and so that with one of these valves seated, the other is maintained in unseated position.

Mounted to extend between cylinders 37 and 38 is a rack member 52, the opposite ends of which support pistons 53 and the teeth of which engage a pinion 54. This pinion is fixedly supported upon a shaft 55. The latter mounts a further pinion connecting with a rack coupled to the aforementioned Arens or equivalent controls. This latter rack and pinion have also not been shown in view of the fact that this structure is obvious.

A pin 56 is carried by the rack member 52 and is operatively coupled to the upper ends of levers 57. The latter are rockingly mounted upon a shaft 58. Also rotatably mounted on this shaft is a cam member 59 which has an extension pivotally coupled to the upper end of a stem 60. The shank of this stem is slidably mounted in an extension 61 of a member 62. The latter is rockingly supported by a pin 63 carried by the lower ends of levers 57 and a spring 64 is interposed between the member 62 and the stem 60.

With the foregoing construction it is apparent that if a pilot desires to operate the windshield wiper, all he will have to do is to open the valve (not shown) coupled to tube 31. This valve may take one of a number of different forms, but preferably is of a nature such that it may be gradually closed. It is obvious that if such a structure is employed, the pilot, in rendering the apparatus inoperative, will be able to bring the parts to a position of rest at any desired point.

With high-pressure fluid (for example, from 300 to 700 pounds per square inch) entering through port 19, it is apparent that the fluid will flow to the manifolds or bore 34 and thence through passages 35 into the valve chambers. If the parts are in the position shown in Fig. 5, this flow will only be effective in the left-hand valve chamber in which, due to the unseating of valve 49, the fluid may pass through the longitudinal bore of plug member 40. Thence it will flow through the transverse bore 42, channel 43, and passage 36 into the space 39 of cylinder 37. Accordingly, the piston 53 which reciprocates within this cylinder will be moved to the right, as viewed in Fig. 5, and shaft 55 will be rotated.

At the same time any fluid within cylinder 38 will be vented by being free to flow from this cylinder through its enlarged portion 39 through connecting passage 36 and groove or channel 43 to transverse passage 42 of the corresponding plug member 40. Thence it will flow between the rod or pin 41, past the unseated valve 48, and then through openings 45 into what may be termed the sump portion of the motor. From this part it will be free to exhaust through port 20 and tube 32.

During this operation of the parts it is apparent that the valve 49 associated with cylinder 38 will remain seated due to the fluid pressure acting on its rear face, the spring 50 and the fact that rod 41 is not exerting a thrust on it such that it will become unseated. Conversely, valve 48 of this particular assembly will remain unseated because of the action of rod 41 and the fact that spring 47 enclosed in the cam follower 46, associated with it, is not under compression.

Now, as the rack member 52 moves in response to the condition of hydraulic unbalance which exists between cylinders 37 and 38, levers 57 will be rocked. As the lower ends of these levers shift beyond a certain point, they will correspondingly move the member 62 and stem 60 so that in conjunction with the extension of cam 59 a reverse toggle action will occur. At that instant spring 64 will cause a shift of cam 59. Such shifting will result in the cam follower 46 appearing on the right in the figure under consideration, being shifted to compress its enclosed spring 47. Consequently, valve 48 will be seated to prevent the further escape of fluid through openings 45. Simultaneously rod 41 will shift to unseat valve 49 and thus permit fluid under pressure to flow from passage 35 through passage 36 connecting with cylinder 38.

Simultaneously with the aforementioned shift of cam 59, the follower 46 appearing at the left-hand side of Fig. 5 will, under the action of its spring 47, move towards shaft 58. Due to the hydraulic pressure and the action of the left-hand rod 41, valve 49, and spring 50, this valve 48 will now be unseated while the valve 49 is seated.

Consequently, a condition of hydraulic unbalance is again established between the cylinders 37 and 38, and the rack member 52 will now move in an opposite direction. This cycle will be repeated indefinitely as long as the line 31 remains connected to the source of hydraulic pressure. Consequently, the pinion 54 will be continuously oscillated in order to cause operation of the wiper arm or arms.

As will be apparent in the afore-described drawings, various refinements may be embodied in the apparatus and including, as shown, cylinder liners, closure plates and detailed piston assemblies, etc., etc. These have not been described in detail in view of the fact that they will be readily apparent to any skilled person.

Moreover, from the foregoing description it will be noted that among others, the several objects of the invention as specifically afore set forth, are achieved. Obviously, numerous changes in construction and re-arrangements of the parts might be resorted to without departing from the spirit of the invention as defined by the claims.

I claim:

1. An apparatus of the character described including in combination a shaft to be rotated, a reciprocable piston, means for coupling said piston with said shaft whereby as the former reciprocates the latter will rotate, means providing a cylinder to receive said piston, means providing a valve chamber and passages extending to said valve chamber and cylinder, a pair of valves disposed within said chamber, means connecting said valves whereby with one of the same closed the other of the same will be open, a rockingly mounted lever extending adjacent said piston, a cam coupled to one of said valves whereby to shift the same, and means connected to said lever and cam to shift the latter and said valves as said piston moves to a predetermined position.

2. An apparatus of the character described including in combination a shaft to be rotated, a reciprocable piston, means for coupling said piston with said shaft whereby as the former reciprocates the latter will rotate, means providing a cylinder to receive said piston, means providing a valve chamber and passages extending to said valve chamber and cylinder, a pair of valves disposed within said chamber, means connecting said valves whereby with one of the same closed the other of the same will be open, a rockingly mounted lever extending adjacent said piston, a cam coupled to one of said valves whereby to shift the same, said cam being free to shift independently of the rocking movement of the lever, a member rockingly supported by said lever, a stem rockingly supported by said cam and having sliding engagement with said member, and a spring interposed between said member and cam whereby when said lever moves beyond a predetermined position said member and stem will in conjunction with said cam present a reverse toggle action such that said cam will be moved to shift said valves.

3. An apparatus of the character described including a body presenting a cylinder bore, valve chamber, and passages extending from the exterior of said body to said chamber and thence to said cylinder bore, a piston reciprocable within said bore, a shaft connected to said piston to rotate in response to reciprocation of the latter, a lever connected to said piston and extending from a point adjacent the same to a point beyond said valve chamber, a pair of valves within said chamber and controlling the flow of fluid through said passages to and from said cylinder, means extending between said valves to alternately maintain one of the same seated when the latter is in unseated condition, a cam rockingly mounted adjacent said chamber, a follower interposed between said cam and one of said valves, and a resilient toggle element interposed between said cam and said lever and whereby to shift the former upon the latter reaching a predetermined position.

4. An apparatus of the character described including a body presenting a cylinder bore, valve chamber, and passages extending from the exterior of said body to said chamber and thence to said cylinder bore, a piston reciprocable within said bore, a shaft connected to said piston to rotate in response to reciprocation of the latter, a lever connected to said piston and extending from a point adjacent the same to a point beyond said valve chamber, a pair of valves within said chamber and controlling the flow of fluid through said passages to and from said cylinder, means extending between said valves to alternately maintain one of the same seated when the latter is in unseated condition, a cam rockingly mounted adjacent said chamber, a follower slidably mounted with respect to said chamber and adapted to be engaged by said cam, a spring interposed between one of said valves and said follower, and a resilient toggle element interposed between said cam and said lever and whereby to shift the former upon the latter reaching a predetermined position.

5. An apparatus of the character describing including in combination a body presenting a cylinder bore, valve chambers and passages extending into said body and said valve chambers as well as between said chambers and the opposite ends of said bore, a double-ended piston of a length shorter than said bore and reciprocable within the same, a rotatable shaft connected to said piston to move in response to the movements of the latter, a pair of valves disposed within each of said chambers, the innermost valves of each pair being spaced from one another, a cam rockingly mounted between said innermost valves, means coupling said valves to said cam whereby as the latter moves said valves will be shifted, means extending between the valves of each pair whereby with one of said valves seated the other will be unseated, a rockingly mounted lever extending between said piston and beyond said cam, and a toggle connection between said cam and the free end of said lever.

6. An apparatus of the character described including in combination a body presenting a cylinder bore, valve chambers and passages extending into said body and said valve chambers as well as between said chambers and the opposite ends of said bore, a double-ended piston of a length shorter than said bore and reciprocable within the same, a rotatable shaft connected to said piston to move in response to movements of the latter, a pair of valves disposed within each of said chambers, the innermost valves of each pair being spaced from one another, a cam rockingly mounted between said innermost valves, a spring-pressed follower associated with the innermost of said valves and extending into contact with said cam whereby as the latter moves the valves of said pairs will be shifted, means extending between the valves of each pair whereby with one of said valves seated the other will be unseated, a rockingly mounted lever extending between said piston and beyond said cam, and a toggle connection between said cam and the free end of said lever.

7. An apparatus of the character described including in combination a body presenting a cylinder bore, valve chambers and passages extending into said body and said valve chambers as well as between said chambers and the opposite ends of said bore, a double-ended piston of a length shorter than said bore and reciprocable within the same, a rotatable shaft connected to said piston to move in response to the movements of the latter, a pair of valves disposed within each of said chambers, the innermost valves of each pair being spaced from one another, a cam rockingly mounted between said innermost valves, means coupling said valves to said cam whereby as the latter moves said valves will be shifted, means extending between the valves of each pair whereby with one of said valves seated the other will be unseated, a shaft rockingly supporting said lever between said innermost valves, said shaft rockingly supporting said cam, said lever extending to one side of said piston, means for connecting said lever with said piston, and means providing a connection between the opposite end of said lever and said cam whereby as the former moves beyond a predetermined point the latter will be shifted.

8. An apparatus of the character described including a body presenting a bore furnishing a pair of cylinders, pistons connected to each other and disposed one within each of said cylinders, said body being formed with a further bore providing a pair of valve compartments, said body being moreover formed with fluid supplying passages extending to said compartments and passages extending between the latter and said cylinders, valve assemblies within each of said compartments and comprising means providing a pair of valve seats, valve bodies cooperable with said seats and springs tending normally to maintain said bodies in seated position and a valve actuator operatively coupled to move in response to movement of said pistons and said actuator engaging certain of said springs in order to shift the valves associated therewith.

9. An apparatus of the character described including a body presenting a bore furnishing a pair of cylinders, pistons connected to each other and disposed one within each of said cylinders, said body being formed with a further bore providing a pair of valve compartments, said body being moreover formed with fluid supplying passages extending to said compartments and passages extending between the latter and said cylinders, valve assemblies within each of said compartments and comprising means providing a pair of valve seats, valve bodies cooperable with said seats, springs cooperative with said valve bodies and in order to maintain the latter in seated position and actuating elements extending between said seats and of a length greater than the distance there between, such elements engaging said valve bodies whereby with one of the same seated, the other of the same will be unseated and valve actuating means operatively coupled to said pistons and cooperative with certain of said springs in order to shift the latter and the valve bodies with which they cooperate.

10. An apparatus of the character described including a body presenting a bore furnishing a pair of cylinders, pistons connected to each other and disposed one within each of said cylinders, said body being formed with a further bore providing a pair of valve compartments, said body being moreover formed with fluid supplying passages extending to said compartments and passages extending between the latter and said cylinders, valve assemblies within each of said compartments and comprising means providing a pair of valve seats, valve bodies cooperable with said seats, said valve bodies being arranged to provide outer as well as inner valves, relatively weak springs tending to seat the outer valves, relatively strong springs cooperating with the inner valve bodies to maintain them in seated positions and means connecting said valve bodies of each assembly and whereby with one of said bodies in seated position, the other of the same will be maintained in unseated position and valve actuating means operatively connected to said pistons and engaging the springs of the innermost valve bodies whereby to operate said assemblies.

11. An apparatus of the character described including in combination, a body formed with a bore providing a pair of opposed cylinders and a further bore providing a pair of valve chambers, said body being moreover formed with fluid supplying passages and passages extending between said bores, pistons mounted for reciprocation within said cylinders and connected to move in synchronism, valve assemblies disposed within said second bore and each of said assemblies including a member providing a pair of seats disposed towards the outer ends and center of said bore and valves cooperative with said seats, at least the valves which are disposed adjacent the fluid supplying passages and the seats cooperative with said valves furnishing "line seals," springs tending to maintain the valve bodies cooperative with the inner seats in seated position and valve actuating means operatively connected to said pistons and coupled to said springs in order to actuate said valves.

ELIAS ORSHANSKY, Jr.